(12) United States Patent
Nireki

(10) Patent No.: US 8,302,962 B2
(45) Date of Patent: Nov. 6, 2012

(54) PAPER SHEET PROCESSING DEVICE HAVING A SHUTTER

(75) Inventor: Takao Nireki, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 61 days.

(21) Appl. No.: 13/045,046

(22) Filed: Mar. 10, 2011

(65) Prior Publication Data

US 2011/0241287 A1    Oct. 6, 2011

(30) Foreign Application Priority Data

Apr. 2, 2010    (JP) .................................. 2010-085671

(51) Int. Cl.
*B65H 31/26*    (2006.01)
(52) U.S. Cl. ......................... 271/220; 271/3.14; 271/207
(58) Field of Classification Search ................. 271/3.14, 271/145, 207, 212, 213; 194/203; 232/15, 232/16
See application file for complete search history.

(56) References Cited

U.S. PATENT DOCUMENTS

| | | | |
|---|---|---|---|
| 6,948,607 B2* | 9/2005 | Ito et al. ......................... | 194/206 |
| 2006/0113160 A1* | 6/2006 | Yamagishi et al. ........... | 194/206 |
| 2006/0243789 A1* | 11/2006 | Lee et al. ....................... | 235/379 |
| 2007/0023255 A1* | 2/2007 | Nunn et al. .................... | 194/206 |
| 2011/0241283 A1* | 10/2011 | Nireki ........................... | 271/145 |

FOREIGN PATENT DOCUMENTS

JP    2005-92776    4/2005

* cited by examiner

*Primary Examiner* — Jeremy R Severson
(74) *Attorney, Agent, or Firm* — Lexyoume IP Meister, PLLC.

(57) ABSTRACT

A paper sheet processing device is provided in which no load is imposed on a primary drive which drives a pressing part for pressing the paper sheets stacked and accommodated and a shutter for opening and closing an insertion slot. The paper sheet processing device of the present invention has an insertion slot through which a paper sheet is inserted, a shutter 8 for opening and closing the insertion slot, a paper magazine in which paper sheets loaded through the insertion slot are sequentially stacked and accommodated, a pressing part 50 which comes into contact with paper sheets accommodated in the paper magazine to press the stacked paper sheets, a cam groove 61A which operates the shutter 8 and the pressing part 50, and a drive motor for driving the cam groove 61A, and the cam groove 61A has such a shape that while one of the shutter 8 and pressing part 50 is in operation, the operation of the other is stopped.

3 Claims, 15 Drawing Sheets

PAPER SHEET PROCESSING DEVICE HAVING A SHUTTER

CROSS-REFERENCE TO RELATED APPLICATIONS

This application is based upon and claims a priority from the prior Japanese patent Application 2010-085671 filed on Apr. 2, 2010, the entire contents of which are incorporated herein by reference.

BACKGROUND OF THE INVENTION

1. Field of the Invention

The present invention relates to a paper sheet processing device which processes bills, card-shaped information recording media, paper sheets in which information such as bar codes are recorded (hereinafter these are collectively referred to as paper sheets).

2. Related Art

Heretofore, card processors (also referred to as card reader/writer) for writing various kinds of information such as personal information and game information of the user on card-like recording media (magnetic cards, IC cards, etc.) or for reading the information recorded are placed in some places like amusement centers and casinos. In addition, as disclosed in, for example, Japanese Laid-open Patent Application No. 2005-92776, some of such card processors have a function to collect (stack) the inserted card when the card is no longer necessary, or, as necessary, issue a stacked card to the user.

The card processor disclosed in Japanese Laid-open Patent Application No. 2005-92776 mentioned above has a stacker for collecting cards incorporated downstream along the transport path of cards, and is so configured that the card is transferred into the stacker along the transport path, and is pushed up from the bottom against the biasing force by a projection engaging the card which is stacked and accommodated. In addition, the projection is formed on the tilting member at one end thereof opposite to the end at which a flap (shutter) for closing a card insertion slot is formed, and the tilting member is supported at its central region so as to be tiltable in a seesaw manner.

In this case, the tilting member engages a cam which is rotationally driven by a drive motor. By rotationally driving the drive motor, the projection is lifted so that a space for accepting the card is formed in the stacker; the flap is lowered so that the insertion slot is opened; the projection is lowered to prevent the card from entering into the stacker; and the flap is lifted to switch to the state that the insertion of a new card is prohibited and the unfair withdrawal of the card is prevented.

SUMMARY OF THE INVENTION

However, The card processor disclosed in Patent Document 1 mentioned above has such a structure that the projection which pushes up the card and the flap which opens and closes the card insertion slot are simultaneously driven via the tilting member which tilts in a seesaw manner, and therefore a load is imposed on the drive motor, thereby increasing the possibility of failure.

The present invention has been made focusing on the above-mentioned problem, and its object is to provide a paper sheet processing device which does not impose a load on a primary drive for driving a pressing part which presses the stacked and accommodated paper sheets and a shutter which opens and closes the insertion slot.

According to one aspect of the invention, there is provided a paper sheet processing device which includes an insertion slot through which a paper sheet is inserted, a shutter for opening and closing the insertion slot, a paper magazine which can sequentially stack and accommodate paper sheets loaded from the insertion slot, a pressing part which comes into contact with a paper sheet accommodated in the paper magazine and presses paper sheets stacked, a cam which operates the shutter and the pressing part, and a primary drive which drives the cam, and the cam having such a shape for stopping the operation of one of the shutter or pressing part while the other is in operation.

In the paper sheet processing device having the above-mentioned construction, a shutter for preventing erroneous insertion and withdrawal of cards due to unfair action is disposed at the insertion slot in a manner of being openable and closable by the primary drive, and the pressing part for pressing the paper sheets stacked and accommodated is disposed at the paper magazine. This pressing part is driven by the primary drive which drives the shutter in a state that a pressure is applied against the biasing force which biases the paper sheets or in a state that the pressure is cancelled. Since the shutter and pressing part are driven individually, a load imposed on the primary drive can be reduced.

According to another aspect of the invention, the primary drive is constructed by a drive motor, and the cam is formed on a gear which is rotationally driven by the drive motor.

In the above-mentioned construction, by forming the cam on the gear which is rotationally driven by the drive motor, the individual operation of the shutter and pressing part can be easily controlled based on the rotational state of the gear.

According to yet another aspect of the invention, the cam is provided with a detection part which is capable of detecting a reference position by a sensor, and by detecting the detection part of the cam by the sensor, the rotation the drive motor is controlled so as to drive either the shutter or the pressing part.

In the above-mentioned construction, when the shutter and the pressing part are individually driven, the rotation of the drive motor is controlled with the reference position of the cam as the center, and therefore the amount of rotation and stop position of the drive motor are specified at all times, and a decrease in the accuracy of the operation of the shutter and the pressing part can be prevented.

According to the present invention, it is possible to obtain a paper sheet processing device in which no load is imposed on the primary drive which drives the pressing part for pressing the paper sheets stacked and accommodated and the shutter for opening and closing the insertion slot.

BRIEF DESCRIPTION OF THE DRAWINGS

7A is a drawing which shows the state that there are few cards; FIG. 7B is a drawing which shows the state that the card magazine is full; and FIG. 7C is a drawing which shows the state that a casing which is a component of the card magazine is open;

FIGS. 9A and 9B show a gear which is a component of the drive mechanism, wherein FIG. 9A is a drawing which shows one side face of the gear, while FIG. 9B is a drawing which shows the other side face thereof;

FIGS. 10A to 10C are drawings which show the individual driving mode of the shutter and the pressing part, wherein FIG. 10A is a drawing which shows the reference position; FIG. 10B is a drawing which shows the state that only the shutter is driven; and FIG. 10C is a drawing which shows the state that only the pressing part is driven;

DESCRIPTION OF THE PREFERRED EMBODIMENTS

An embodiment of the paper sheet processing device according to the present invention will be described below with reference to the drawings. It should be noted that the paper sheet processing device in this embodiment can be placed, for example, in connection with various kinds of game machines placed in hotels and amusement centers such as casinos, and is constructed as a device (hereinafter referred to as card processor) for processing a card-shaped recording medium (hereinafter referred to as card) owned by the user. In this case, the card processor of this embodiment is constructed to allow reading/rewriting of the information recorded in the card inserted by the user, and further collection/issuance of a card, as necessary. In addition, the card processor of this embodiment is constructed to be capable of processing multiple types of cards (magnetic cards, IC cards, IC/magnetic cards).

First referring to FIGS. 1 to 6, the overall construction of the card processor according to this embodiment will be described.

Figure 1:
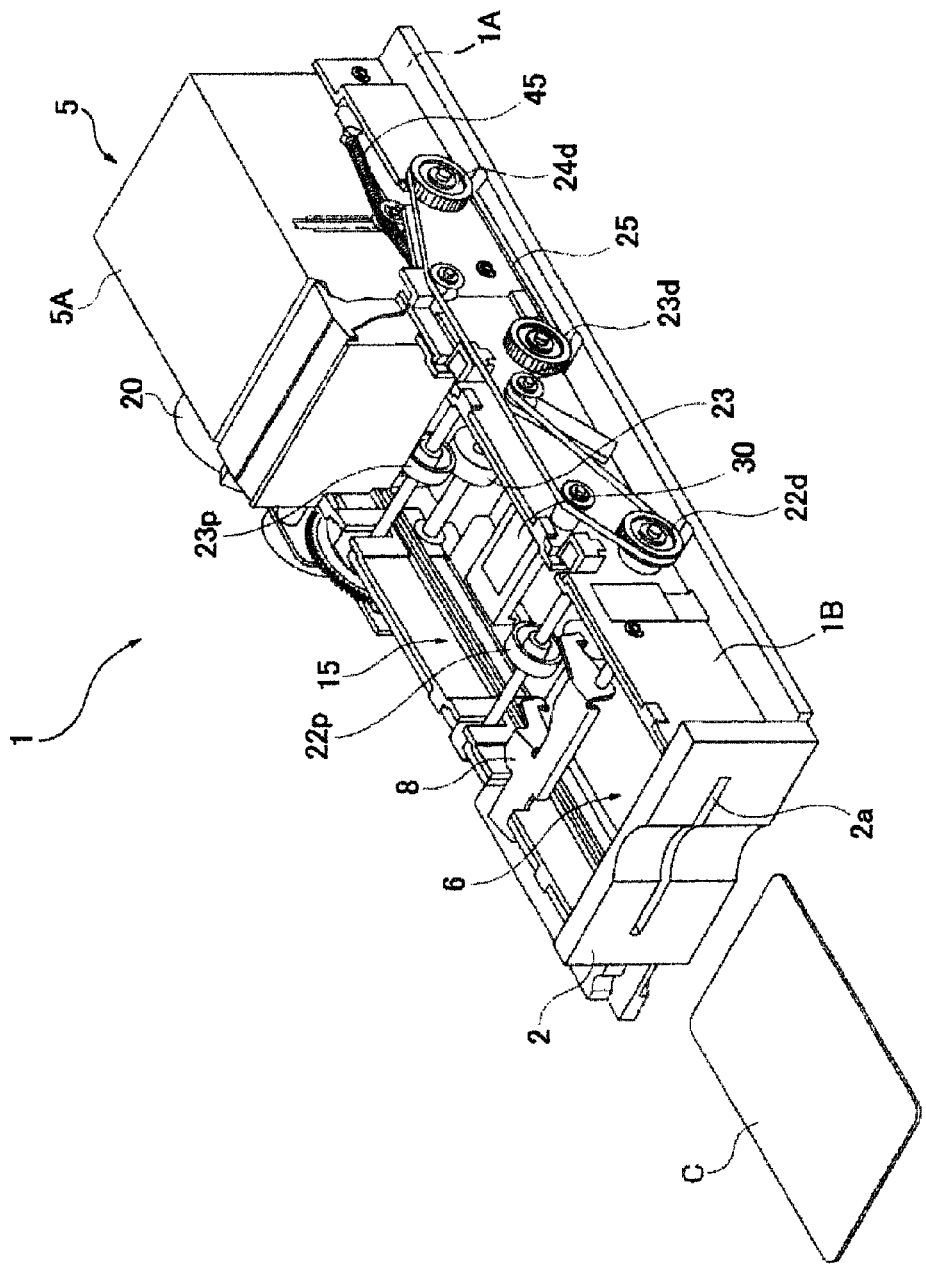
FIG. 1 is a drawing which shows an example (card processor) of the paper sheet processing device according to the present invention, and is a perspective view which shows the entire construction.
Figure 2:
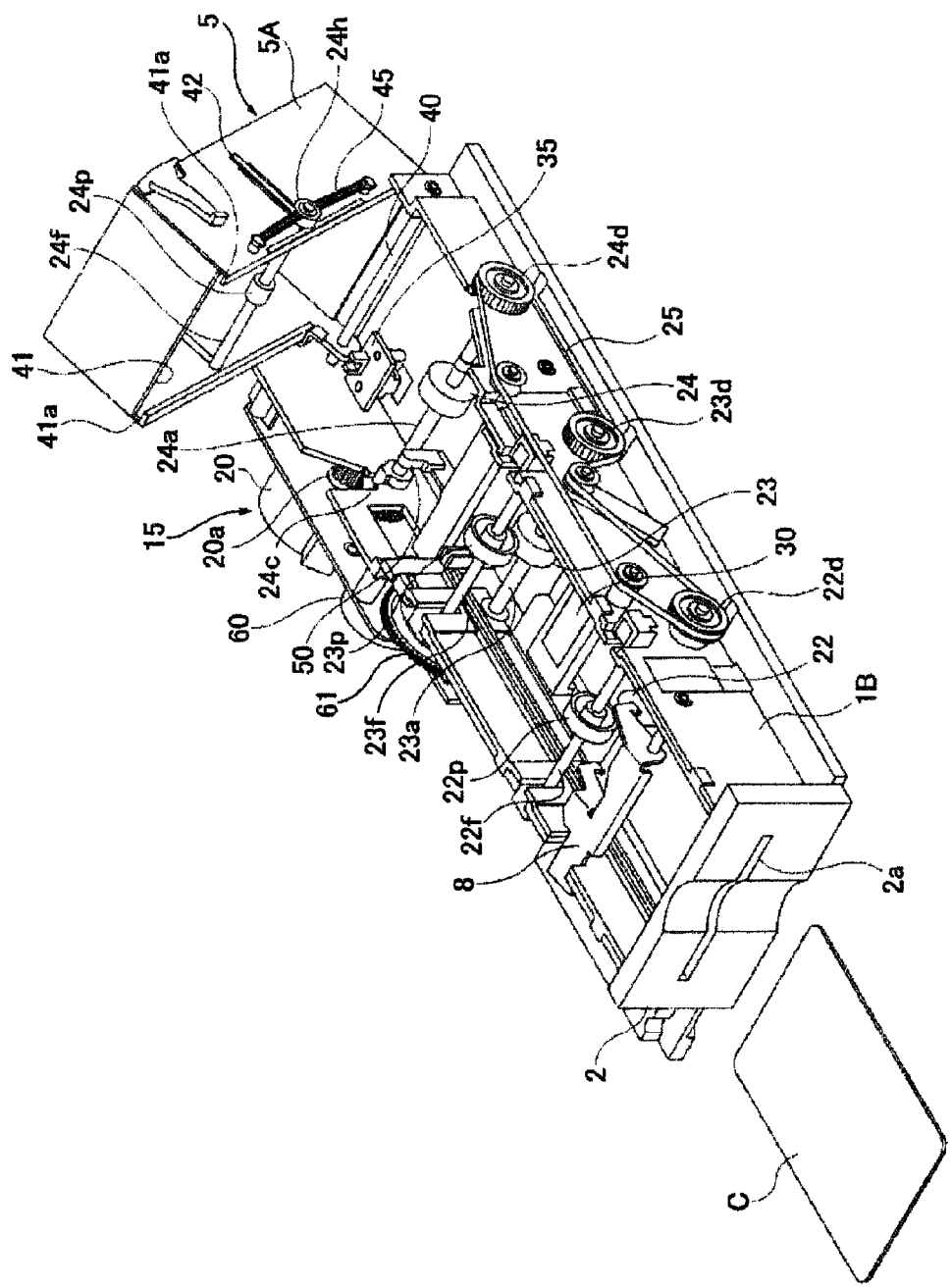
FIG. 2 is a perspective view which shows the state that the card magazine in the card processor shown in FIG. 1 is open.
Figure 3:
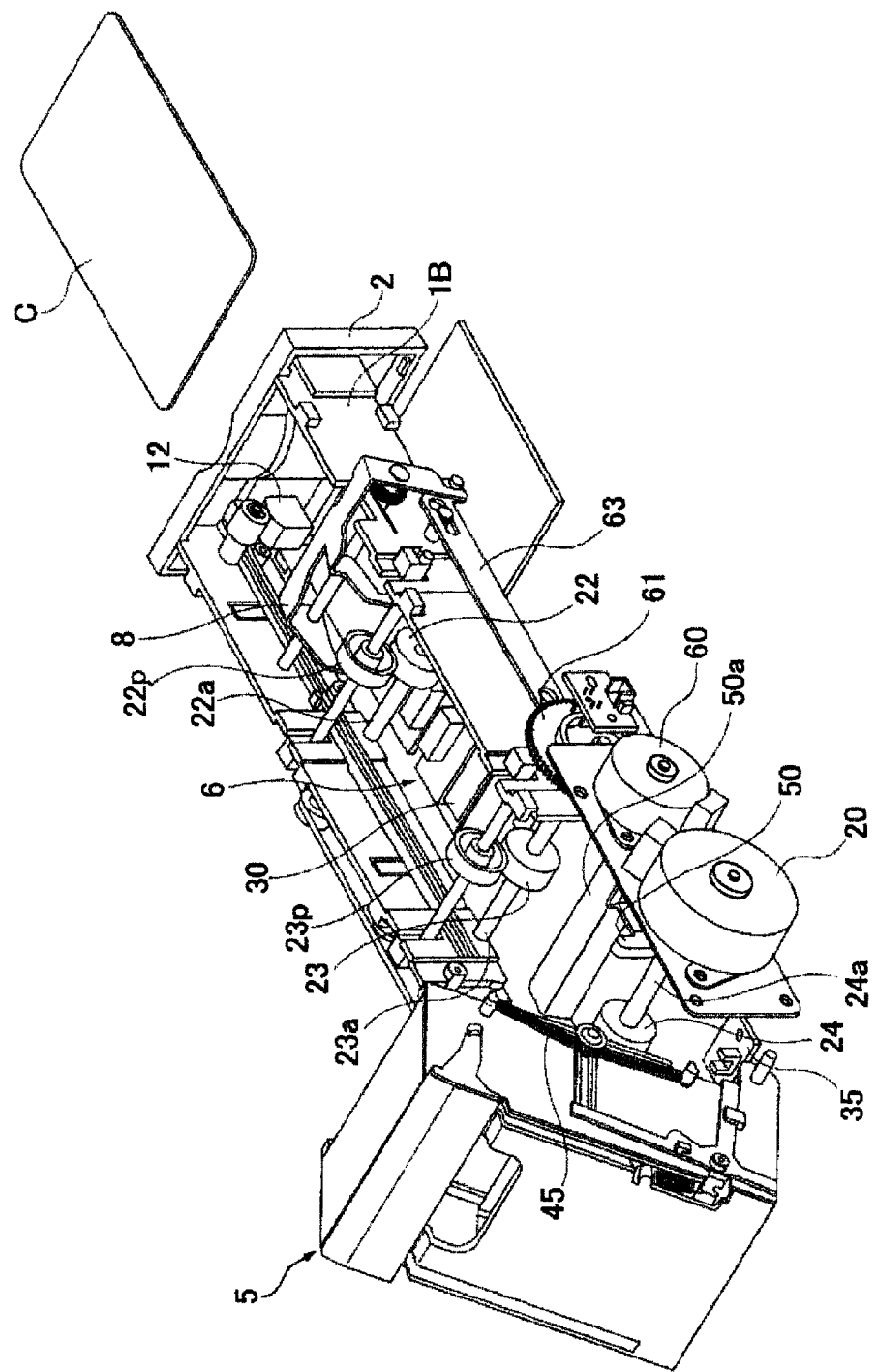
FIG. 3 is a drawing of the card processor shown in FIG. 2 seen from the opposite side.
Figure 4:
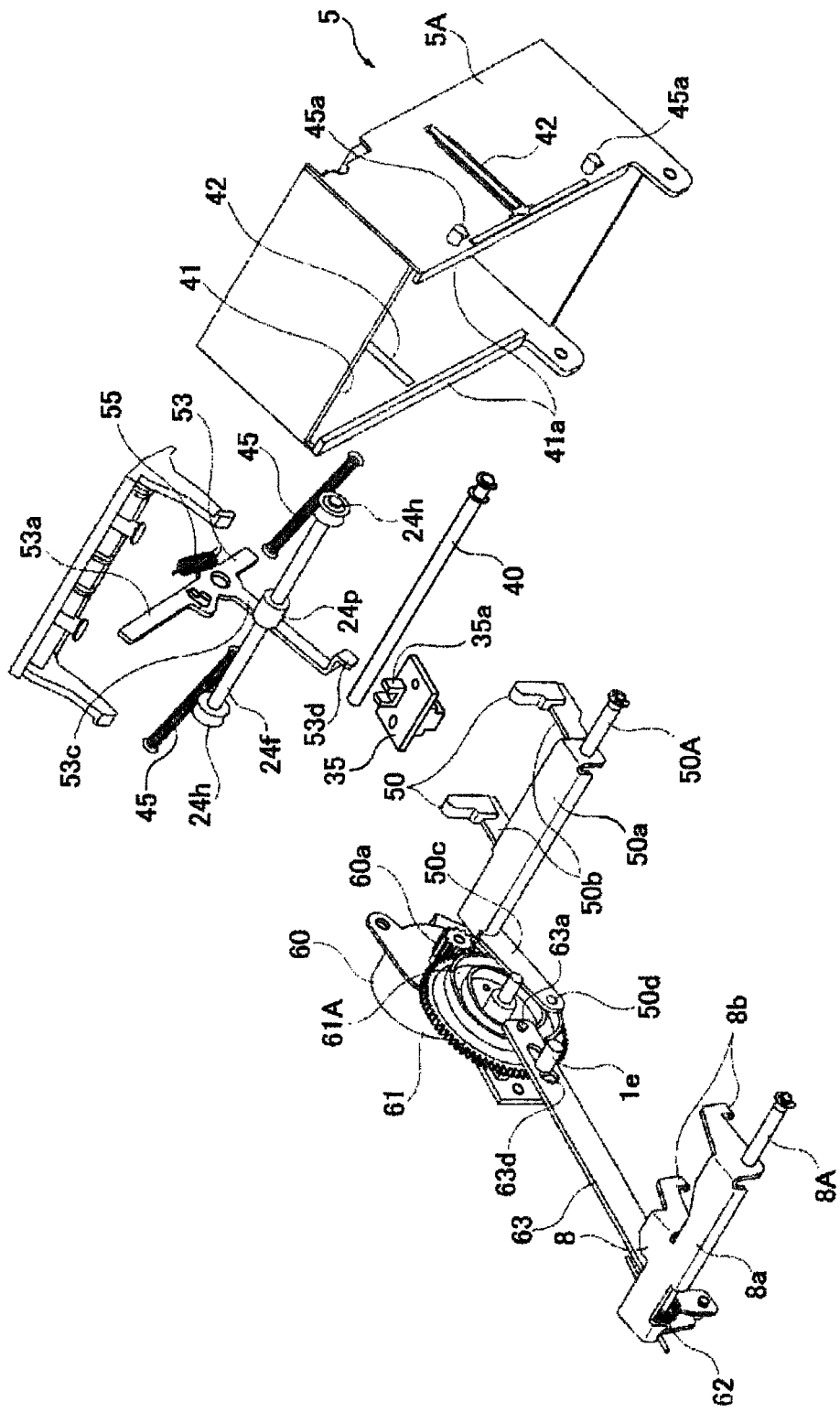
FIG. 4 is an exploded perspective view which shows a main part of the card processor shown in FIG. 2.
Figure 5:
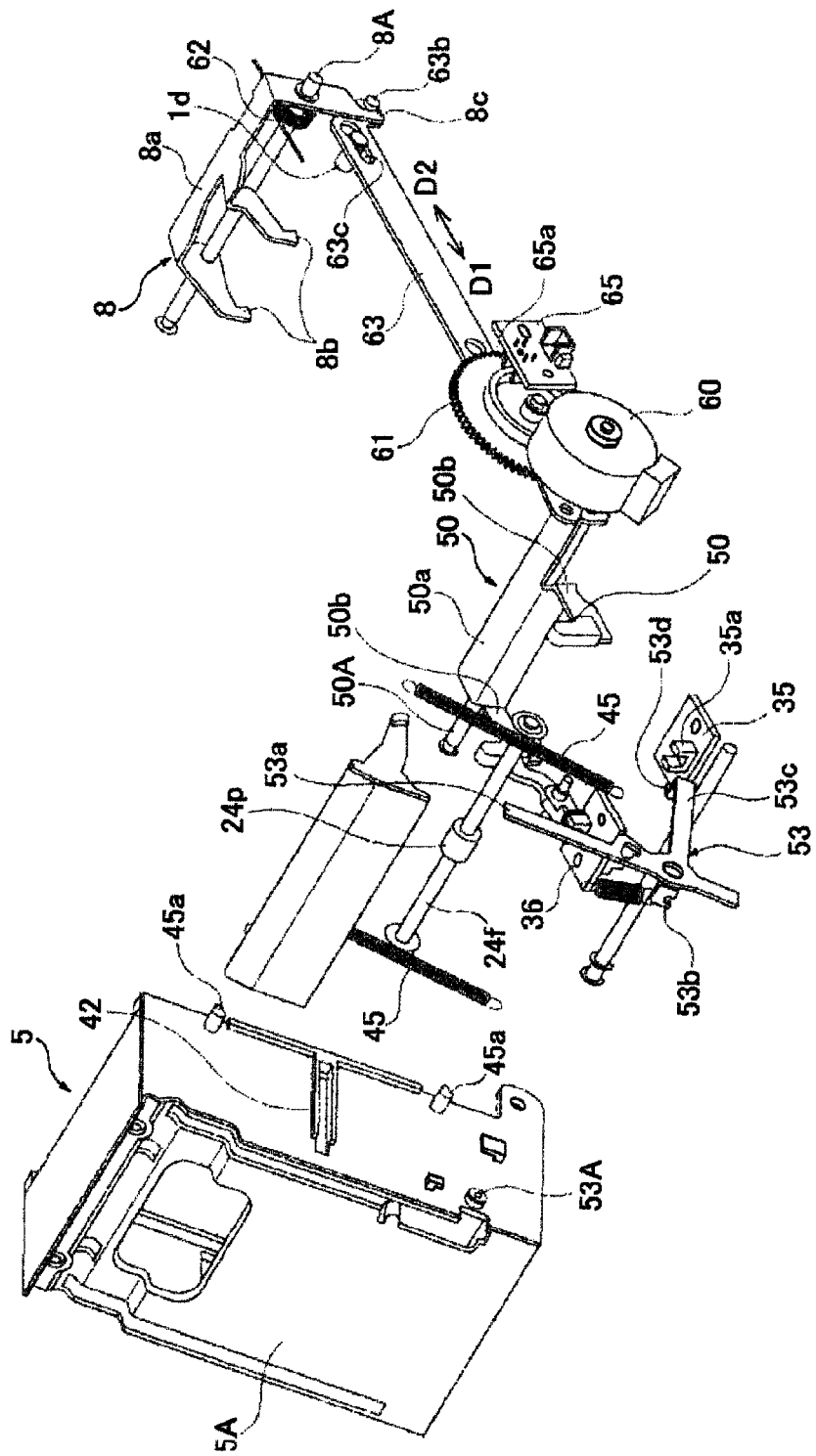
FIG. 5 is an exploded perspective view which shows a main part of the card processor shown in FIG. 3.
Figure 6:
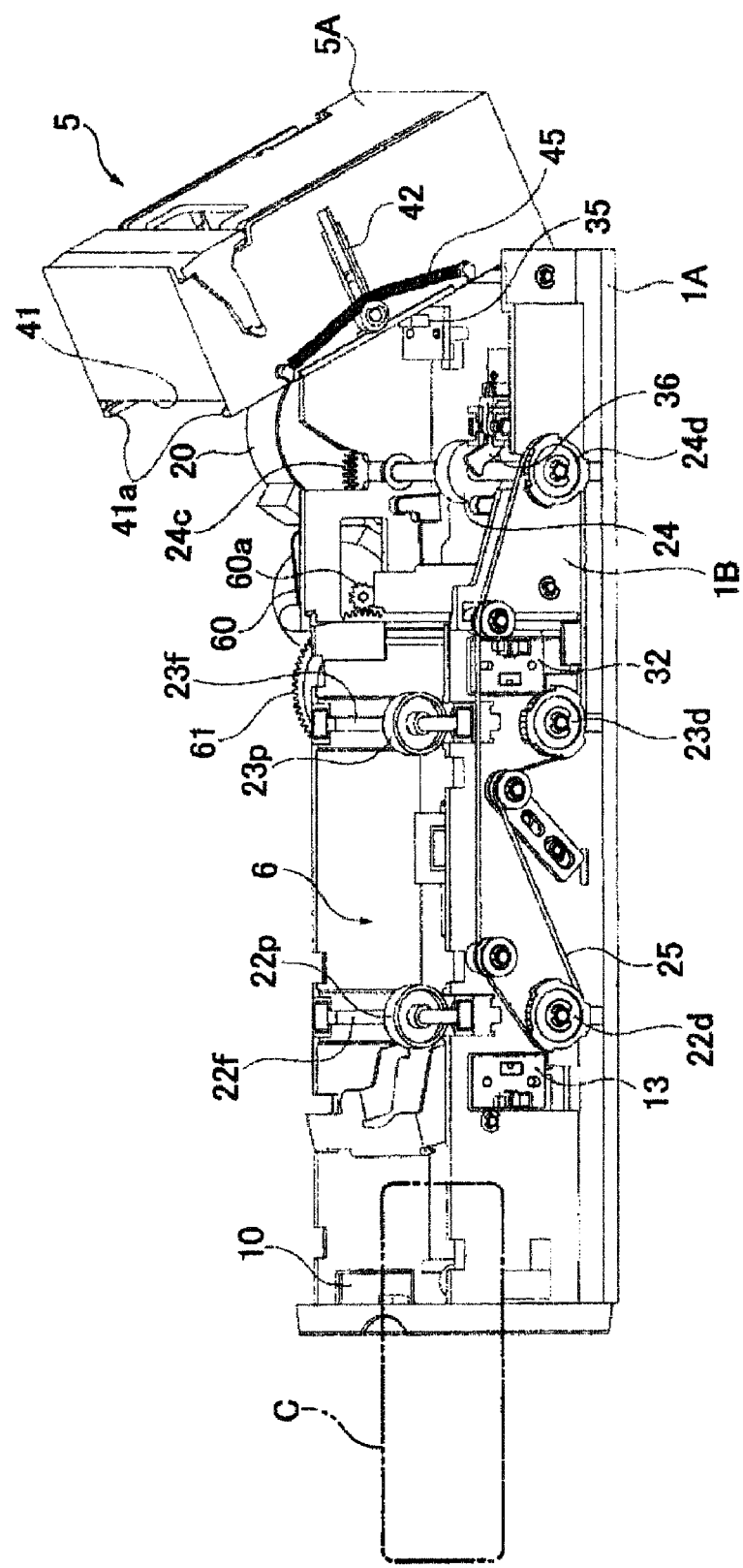
FIG. 6 is a perspective view of the card processor shown in FIG. 1 seen from the side.

In these drawings, FIG. 1 is a drawing which shows a card processor and a perspective view showing the entire construction; FIG. 2 is a perspective view which shows the state that the card magazine is open in the card processor shown in FIG. 1; FIG. 3 is a drawing of the card processor shown in FIG. 2 seen from the opposite side; FIG. 4 is an exploded perspective view which shows a main part of the card processor shown in FIG. 2; FIG. 5 is an exploded perspective view which shows a main part of the card processor shown in FIG. 3; and FIG. 6 is a perspective view of the card processor shown in FIG. 1 seen from the side.

A card processor 1 has a base 1A provided with a frame 1B on which various components are mounted, and is configured so that a front face 2 formed integrally with the frame 1B is exposed when it is installed in connection with a game machine (not shown). An insertion slot 2a which allows insertion and discharge of cards is formed on the front face 2. The user inserts his/her card (magnetic card, IC card, IC/magnetic card) C, and when the game play is over, the card C is returned to the user or collected (in this embodiment, collected media are IC cards and IC/magnetic cards). Accordingly, a card magazine 5 which can collect and accommodate the card inserted by the user is provided on the frame 1B. The insertion slot 2a desirably has a curved shape which widely opens in its central portion in the vertical direction so that it can handle warped cards. In addition, the cards accommodated in the card magazine 5 can be issued to the user with new information recorded therein.

For example, information about the user (ID information), information associated with game credit (amount information) and the like are recorded in the card C, and various information can be read or rewritten by a reader/writer installed inside the game machine. Such information are managed by an external device (not shown), and the user can use a lending process of various kinds of game media and play games within the range of the amount information written in the card. In addition, the game information of the user can be also managed as, for example, tracking information, and the amount information can be used outside the amusement center, or point information and the like which can be converted into monetary values can be also imparted separately.

The frame 1B is provided with a card transport path 6 which can transport the card as is in the direction of insertion of the card. In this case, this embodiment is configured to execute different transport processes depending on whether the inserted card is a magnetic card or an IC card (including magnetic/IC card). Specifically, if the inserted card is a magnetic card, the card inserted by the user is stopped in a predetermined position (such a position that the rear end side of the card protrudes from an insertion slot 2a). That is, the device is constructed to prevent transporting of a card into the device when it is a magnetic card, stop the card in the predetermined position, and execute a reading process (in some cases, rewrite) information in that position.

Accordingly, a shutter 8 for stopping the card in such a position that the rear end side of the inserted card protrudes from the insertion slot 2a is placed on the card transport path 6, and this shutter 8 is configured to be driven for opening and closing depending on the type of the inserted card. The specific construction of the shutter 8 and the method for driving the same for opening and closing will be described later.

An insertion detection sensor 10 which detects the insertion of the card is disposed on the card transport path 6 to the insertion slot 2a side from the position in which the shutter 8 is placed (refer to FIG. 6). In addition, a reader/writer (magnetic head) 12 which can read/rewrite magnetic information is placed (refer to FIG. 3) in the position opposing the insertion detection sensor 10, specifically, in the position corresponding to a region in which magnetic information is recorded (formed in a strip shape along the direction of transport) formed on the inserted magnetic card. Furthermore, in a position just short of the position where the shutter 8 is placed, a magnetic reading completion sensor 13 for detecting the completion of reading of the magnetic information by the magnetic head 12 is disposed (refer to FIG. 6). Since the magnetic information is recorded in a magnetic sticker attached to the card in a strip shape, this magnetic reading completion sensor 13 is disposed in a position corresponding to the position where the magnetic sticker on the inserted card is read. That is, a signal of completion of reading of the magnetic information is generated by of the position of the front end of the inserted card by the magnetic reading completion sensor 13.

A card transport mechanism 15 which is capable of transporting the card is placed downstream of the shutter 8. The card transport mechanism 15 in this embodiment is constructed to be capable of transporting the card inserted from the insertion slot 2a along the direction of insertion of the card, and transporting the card positioned within the main body of the device toward the insertion slot 2a side. The transport mechanism 15 is provided with a drive motor 20 which is a primary drive placed on the frame 1B and a plurality of driving rollers 22, 23, and 24 which are rotationally driven by this drive motor 20 and are capable of transporting the card. In this case, the driving rollers 22, 23 are placed upstream of the card magazine 5, and the driving roller 24 is disposed within the card magazine 5.

The driving rollers 22, 23, and 24 are attached to the mid positions of drive shafts 22a, 23a, 24a, respectively, which are rotationally laterally supported on the frame 1B. The drive shaft 24a is rotationally driven by meshing a gear 24c fixed at one end thereof and an output gear 20a fixed to an output shaft of the drive motor 20. In addition, the drive shaft 24a is provided with a pulley or a timing pulley (hereinafter referred to as pulley) 24d at the other end thereof. This pulley 24d is connected between the pulleys or timing pulleys 22d, 23d provided at ends of the drive shafts 22a, 23a via a transport belt 25. Accordingly, the driving rollers 22, 23, and 24 can be synchronously driven by the rotational driving of the drive motor 20. As shown in the drawings, the transport belt 25 may be constructed to be wound on a tension roller to prevent slackness as necessary.

In addition, pinch rollers 22p, 23p, and 24p are disposed opposite the driving rollers 22, 23, and 24, and the card inserted through the insertion slot 2a is transported through a nipping portion between the driving rollers and pinch rollers. The pinch rollers are fixed on pivots 22f, 23f rotatably supported on the frame 1B and a pivot 24f rotatably supported within the card magazine 5 (casing 5A), respectively. As will be described later, the pinch roller 24p provided in the casing 5A functions as a pressing roller for thrusting the uppermost card in the stack of accommodated cards to apply a biasing force.

Within the frame 1B, an IC reader/writer (IC antenna) 30 which is capable of reading/rewriting information in an IC chip embedded in the inserted IC card is placed in the mid position between the driving rollers 22, 23 are arranged. In this case, the inserted IC card is paused in a state that it is held between the driving roller 22 and the pinch roller 22p at its rear end side and held between the driving roller 23 and the pinch roller 23p on the front end side, and in this paused state, the IC reader/writer 30 executes an information reading/rewriting process. In addition, a card position detection sensor 32 for detecting the position of the card is disposed short of the card magazine 5 on the card transport path 6.

Second, the construction of the card magazine 5 for accommodating cards and components relating to the same will be described.

The card magazine 5 is provided with an approximately cube-shaped casing 5A for stacking and accommodating the inserted cards. This casing 5A retains a pivot 40 on the rear end side thereof, and the pivot 40 is rotatably supported on the frame 1B, whereby, as shown in FIGS. 1 and 2, it is made rotatable relative to the frame 1B. FIG. 1 shows its closed state (locked state), while FIG. 2 shows its open state.

In a lower part of the surface of the front end of the casing 5A, an opening 41 corresponding to the shape of the card is formed so as to allow loading of cards, and cards loaded from this opening are placed on top of each other to be gradually stacked in the casing. The cards loaded into the casing 5A and the cards accommodated in the casing 5A are transported by the driving roller 24.

In this embodiment, the device is configured to stack the cards loaded in the casing 5A from bottom to top, and the pinch roller 24p functions to thrust the uppermost card in the cards being stacked to bias the stacked cards to the driving roller 24 side. Specifically, both ends of the pivot 24f protrude from long holes 42 formed on both side surfaces of the casing 5A along the stacking direction, and are retained by a retaining portion 24h to prevent slip-off in this protruding portion. The pivot 24f is supported vertically slidably along the long holes 42. In addition, the casing 5A is provided with a biasing means for biasing downwardly (the side of stacked cards) the pivot 24 at all times. In this case, the biasing means is constructed by a biasing spring 45 stretching in the horizontal direction in lower portions of both side surfaces of the casing 5A. By bringing this biasing spring 45 into close contact with the upper portion side of the retaining portion 24h, the pivot 24f (pinch roller 24p) is biased downwardly at all times. Specifically, the biasing spring 45 is retained at its both ends by projections 45a protruding on both side surfaces of the casing 5A horizontally at predetermined intervals, and is in contact with the retaining portion 24h near the center thereof, whereby the pivot 24f is biased downwardly at all times.

In addition, a pressing part 50 for pressing the lowermost card in the stack upwardly is arranged in the casing 5A. Two of this pressing part 50 are provided upstream of the drive shaft 24a of the driving roller 24 along the drive shaft at predetermined intervals, and the driving roller 24 and the pinch roller (pressing roller) 24p are arranged in the midposition between the two pressing parts 50.

The pressing part 50 is configured to be driven along the stacking direction between a position in which a pressure is exerted on the stacked cards biased by the pinch roller 24p against the biasing force and a position in which the pressure is not exerted. In this case, when the pressing part 50 is driven to the position in which the pressure is exerted, the card loaded into the casing 5A through the opening 41 formed on the casing 5A is stopped by the pressing part 50, and are inserted under the lowermost card in the stack. In addition, when the pressing part 50 is driven to the position in which the pressure is not exerted, the stacked cards are biased by the pinch roller 24p, and both sides of the lowermost card are pressed against a pair of left and right flanges 41a formed at the opening part of the casing along the longitudinal direction (in this state, the lowermost card is set to be pressed against the driving roller 24, and the issuing process of the accommodated cards is made possible by driving the driving roller 24). The construction of the pressing part 50 and the method for driving the same will be described later.

In the card magazine 5, a magazine detection sensor 35 which can detect that the card magazine is full of cards, and can detect that the card magazine 5 is not locked to the frame 1B (open state) is disposed. In addition, an empty sensor 36 which detects that the card magazine 5 is empty of cards is disposed in the card magazine 5.

Herein, specific construction and operation for detecting the card full state by the magazine detection sensor 35 and detecting the state that the card magazine 5 is open will be described. Their operations will be described with reference to FIGS. 7A to 7C.

The magazine detection sensor 35 is constructed by a photosensor, and is constructed to generate a detection signal by the movement of a moving member, which will be described later, relative to a light receiving and emitting part 35a constructed in a concave shape. The approximately T-shaped moving member 53 is supported in an upper part of one side face of the casing 5A rotatably about a fulcrum 53A. The moving member 53 is provided with a contact part 53a extending towards the insertion slot side, and the above-described retaining portion 24h (biasing spring 45), when lifted, comes into contact with this contact part 53a. In this case, a setting is made so that the retaining portion 24h comes into contact with the contact part 53a when the cards in the casing 5A are stacked up (which elevates the pivot 24f), and finally the cards are almost full (the state that a predetermined level has been reached) (refer to FIGS. 7A and 7B).

Figure 7A:
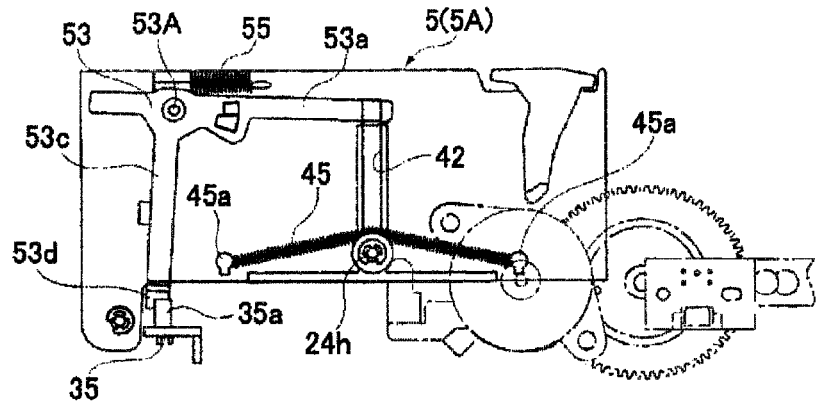
FIGS. 7A to 7C are side elevational views which show the schematic construction of the card magazine, wherein FIG.
Figure 7B:
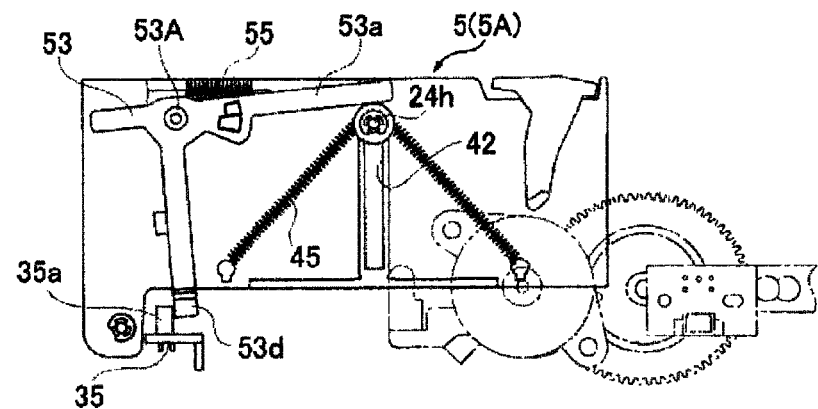

In addition, the moving member 53 is provided with a bend portion 53b which bends to the upper face side of the casing 5A, and a tension spring 55 is arranged between this bend portion 53b and the casing 5A. Accordingly, the moving member 53 is biased in the clockwise direction at all times about the fulcrum 53A in such a state that is shown in FIG. 7A. Furthermore, the moving member 53 is provided with an extension 53c extending downwardly, and a bend portion 53d bent in an L-shape toward the inside of the casing is formed at its front end. This bend portion 53d is formed to be positioned within the above-mentioned light receiving and emitting part 35a in the state shown in FIG. 7A.

Figure 7C:
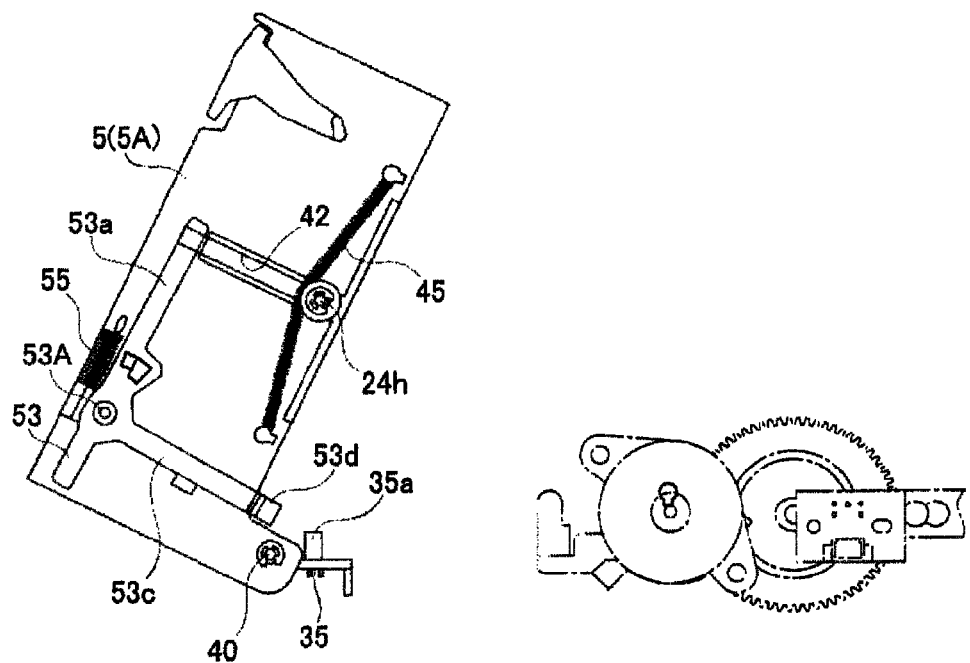

In the above-mentioned construction, in a state that cards are not fully accommodated in the casing 5A, the moving member 53 is in the state shown in FIG. 7A. Therefore, the bend portion 53d is positioned within the light receiving and emitting part 35a, and a detection signal for detecting the full state is thus not generated. In addition, when the cards are fully accommodated in the casing 5A, the retaining portion 24h (biasing spring 45) comes into contact with the contact part 53a, and the moving member 53 is rotated in the counterclockwise direction about the fulcrum 53A (refer to FIG. 7B) in a state that the casing is full of cards. At this time, since the bend portion 53d is also integrally rotated and shifted to the insertion slot side to be positioned outside the light receiving and emitting part 35a, a detection signal for detecting this state (full state) is generated. Meanwhile, regardless of such a full state, when the casing 5A is opened (unlocked) about the pivot 40 as shown in FIG. 7C, the above-mentioned moving member 53 is also integrally rotated. Therefore, the bend portion 53d is also integrally rotated and comes outside the light receiving and emitting part 35a, whereby a detection signal for detecting this state (the open state of the casing) is generated.

As mentioned above, the magazine detection sensor 35 can detect that the cards accommodated in the card magazine 5 is full, and detect that the card magazine 5 is not locked (not closed) to the frame 1B by a single construction.

Next referring to FIGS. 4, 5 and FIGS. 8 to 10, the specific construction of the above-mentioned shutter 8 and the method for driving the shutter for opening and closing, and the specific construction of the above-mentioned pressing part 50, and the method for driving the pressing part will be described.

The shutter 8 and the pressing part 50 are constructed to be driven by the same primary drive, and their driving is controlled by the rotational drive of the drive motor 60 supported on the frame 1B. That is, a cam gear 61 rotatably supported on the frame 1B meshes with an output gear 60a of the drive motor 60, and the above-mentioned shutter 8 and the pressing part 50 are driven by rotationally driving this cam gear 61.

The shutter 8 is provided rotationally on a pivot 8A supported on the frame 1B as shown in FIGS. 4 and 5. The shutter 8 is formed by bending a plate-shaped plate 8a into a predetermined shape, and is provided with a pair of stop parts 8b which stop an actually inserted card by thrusting, and an engaging portion 8c hanging downwardly from the pivot 8A on one end side thereof. In this case, a rotational biasing spring 62 wound on the pivot 8A is arranged between the shutter 8 and the pivot 8A. The rotational biasing spring 62 biases the shutter 8 in the closing direction (direction to prevent insertion of the card) at all times. In addition, the shutter 8 is rotatably supported on the pivot 8A by this rotational biasing spring 62 with a certain degree of play. That is, by imparting a certain degree of play to the rotation of the shutter 8 as mentioned, the card can be withdrawn without being damaged even if a card is stopped in a portion of the shutter 8 for any reason, and damaged mechanism parts can be prevented.

Between the shutter 8 and the cam gear 61, a link member 63 extending along the card transport path 6 is disposed. at one side end of this link member 63 is formed an engaging portion 63a which engages a cam groove 61A formed on one side face of the cam gear 61 (refer to FIG. 9B), while on the other end side thereof is formed a contact part 63b against which the engaging portion 8c of the shutter 8 is thrusted. In addition, long holes 63c, 63d are formed on the link member 63 along the extending direction. By disposing pins 1d, 1e protruding from the frame 1B in these portions, the link member 63 is constructed to be capable of sliding along the extending direction.

Figure 10A:
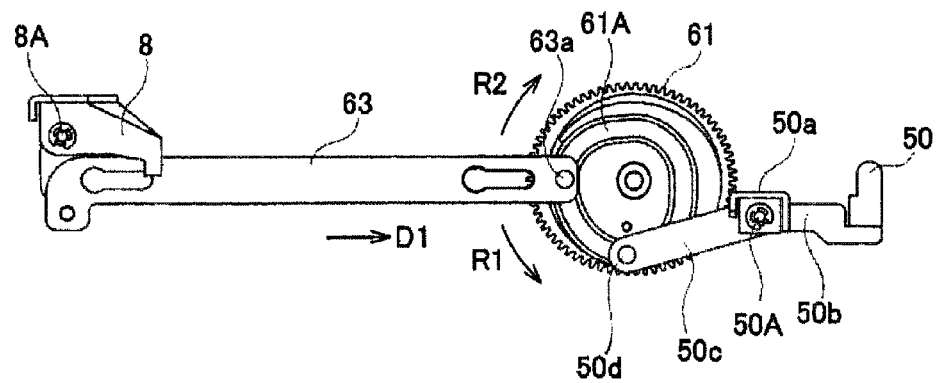

When the link member 63 slides in direction D1 in a closed state of the shutter 8 shown in FIGS. 5 and 10A (this state will be referred to as a reference position for preventing insertion of the card), the contact part 63b presses the engaging portion 8c, and rotates the shutter 8 in the opening direction with the pivot 8A as the center. In addition, when the link member 63 slides in a direction D2 in this state, the shutter 8 rotates by the biasing force of the rotational biasing spring 62 until the engaging portion 8c is thrusted against the contact part 63b, and returns to the reference position again.

The pressing part 50 is, as shown in FIGS. 4 and 5, provided rotatably on the pivot 50A supported on the frame 1B. In this case, the pressing part 50 is arranged to protrude upwardly at the front ends of a pair of extensions 50b formed by bending the plate-shaped plate 50a into a predetermined shape rearwardly (direction opposite to the insertion slot) about the pivot 50A. In addition, a link part 50c bent toward the insertion slot side is formed on the plate 50a, and an engaging portion 50d which engages the cam groove 61A formed on the cam gear 61 is formed at the front end of this link part 50c.

Figure 9A:
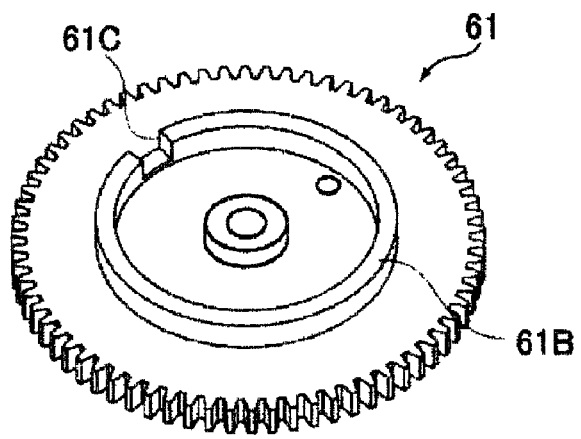
Figure 9B:
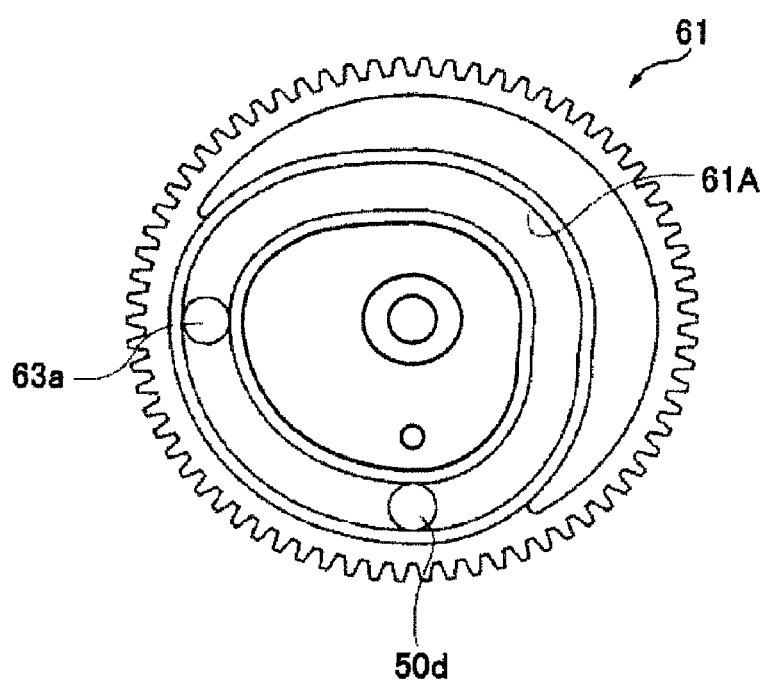

The cam groove 61A formed on one side face of the cam gear 61 has the shape shown in FIG. 9B. The engaging portion 63a of the link member 63 mentioned above engages this cam groove 61A, and the engaging portion 50d of the link part 50c combined with the pressing part 50 engages this cam groove 61A. In this case, the cam groove 61A has such a shape that while one of the shutter 8 and pressing part 50 is in operation, the operation of the other is stopped. Specifically, an engaging portion 63a for driving the shutter 8 and an engaging portion 50d for driving the pressing part 50 are engaged with a phase difference of 90° relative to the cam groove 61A formed in a ring shape. The shape of the cam is such that the link member 63 is solely reciprocated in the horizontal direction and the link part 50c is solely reciprocated in the vertical direction which is perpendicular to the link part 50c by rotating the cam gear 61. When the link part 50c reciprocates in the vertical direction, the plate 50*a* rotates about the pivot 50A. Therefore, the pressing part 50 accordingly reciprocates in the vertical direction.

The cam gear 61 is controlled to be rotationally driven ±90° about the reference position, and as the cam gear 61 rotates, the cam groove 61A formed on the cam gear 61 controls the driving of the shutter 8 and the pressing part 50 so that they are in different positions in the following three positions: the reference position; the position that the cam gear 61 has rotated +90°; and the position that the cam gear 61 has rotated −90°. As shown in FIG. 9A, a ring 61B having a notch (constructing the detection part) 61C in part is provided on the other side face of the cam gear 61, so that the light receiving and emitting part 65*a* of the reference position detection sensor 65 installed on the frame 1B detects the reference position by detecting this notch 61C.

Now referring to FIG. 10, the relationship (the shape of the cam groove 61A) between of the above three positions when the cam gear 61 is rotationally driven ±90° about the reference position will be described.

FIG. 10A shows the reference position. In this state, the shutter 8 is in the closed position, while the pressing part 50 is in the pressing position (the state that the pressing part 50 is in contact with the lowermost card accommodated in the card magazine 5 and pushing up the cards against the biasing force).

Figure 8:
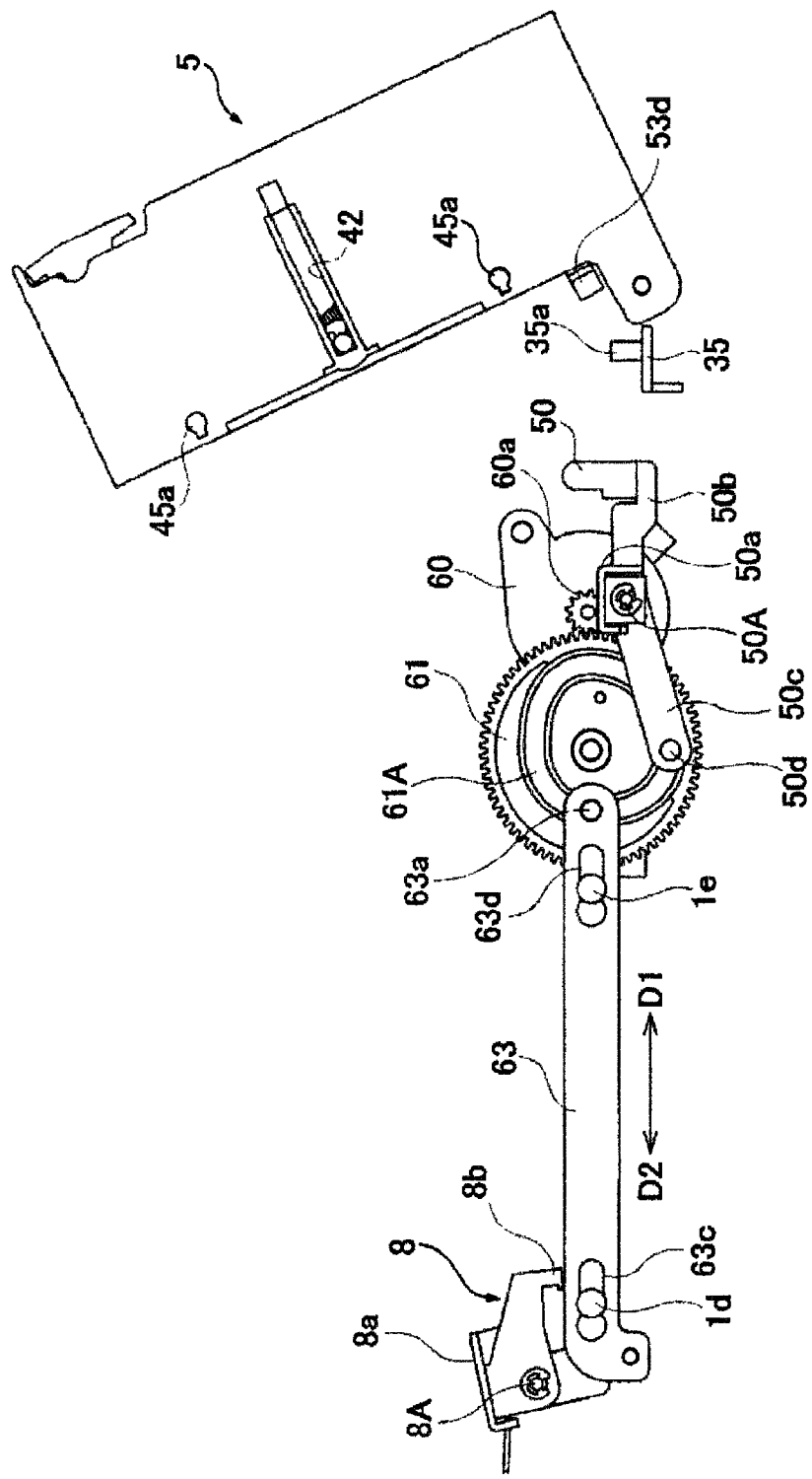
FIG. 8 is a drawing which shows the schematic construction of a drive mechanism which individually drives the shutter and the pressing part.
Figure 10B:
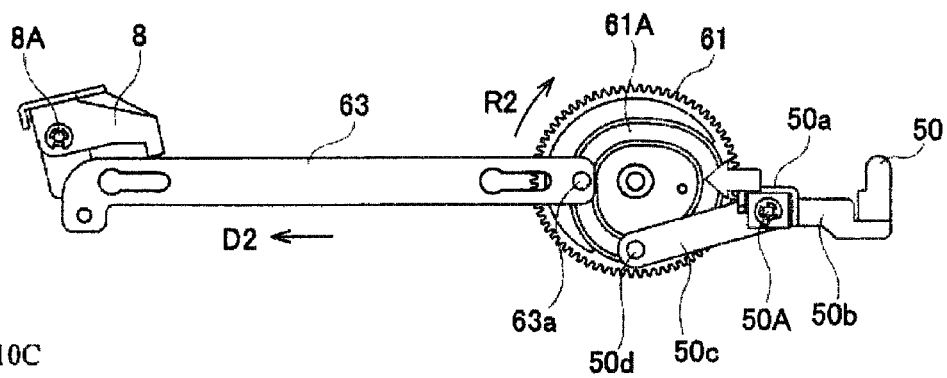

The cam groove 61A has such a shape that when the drive motor 60 is rotated and the cam gear 61 is rotated 90° in direction R1 from the state shown in FIG. 10A, it tracts the link member 63 in direction D1 via the engaging portion 63*a*, and retains the engaging portion 50*d* in the same position without elevating or lowering the same (refer to FIGS. 10B and 8). In this case, if the link member 63 slides in direction D1, as shown in FIG. 5, the shutter 8 is rotated against the biasing force of the rotational biasing spring 62 due to the above-mentioned engagement relationship, and is opened. That is, the shutter 8 is driven and opened by rotating the cam gear 61 90° in direction R1, and the pressing part 50 stays undriven and pressed.

In addition, in the state shown in FIG. 10B, when the drive motor 60 is rotated again and the cam gear 61 is rotated 90° in direction R2, the link member 63 slides in direction D2. Accordingly, as shown in FIG. 5, the shutter 8 is rotated by the biasing force of the rotational biasing spring 62 due to the above-mentioned engagement relationship, returns to the reference position shown in FIG. 10A and closes. The pressing part 50 stays undriven and pressed.

Figure 10C:
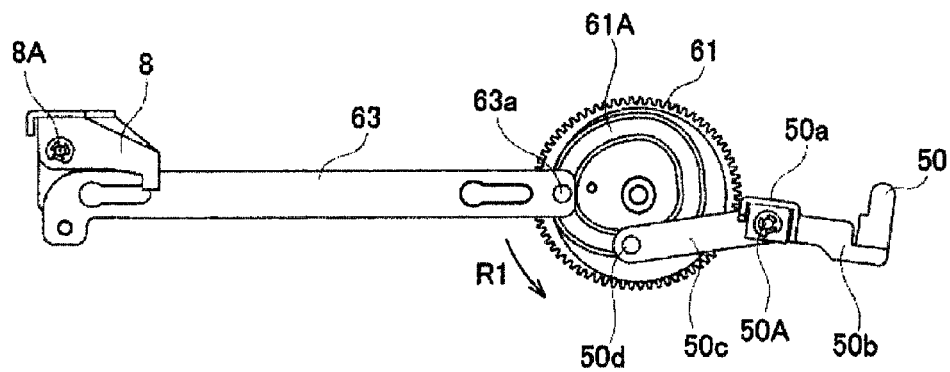

The cam groove 61A has such a shape that when the drive motor 60 is rotated and the cam gear 61 is rotated 90° in direction R2 from the state shown in FIG. 10A, the cam groove 61A retains the engaging portion 63*a* in the same position without tracting the same, and the engaging portion 50*d* is moved upwardly (refer to FIG. 10C). In this case, the upward movement of the engaging portion 50*d* rotates the plate 50*a* about the pivot 50A in the clockwise direction, and moves the pressing part 50 downwardly, whereby the cards accommodated in the card magazine 5 become unpressed. Accordingly, the lowermost card comes into contact with the driving roller 24.

In addition, when the drive motor 60 is rotated again to rotate the cam gear 61 90° in direction R1 in the state shown in FIG. 10C, the engaging portion 50*d* moves downwardly. Accordingly, the cam gear 61 returns to the reference position shown in FIG. 10A, and the pressing part 50 presses the lowermost card in the stack accommodated in the card magazine 5. The shutter 8 stays undriven and closed.

Figure 11:
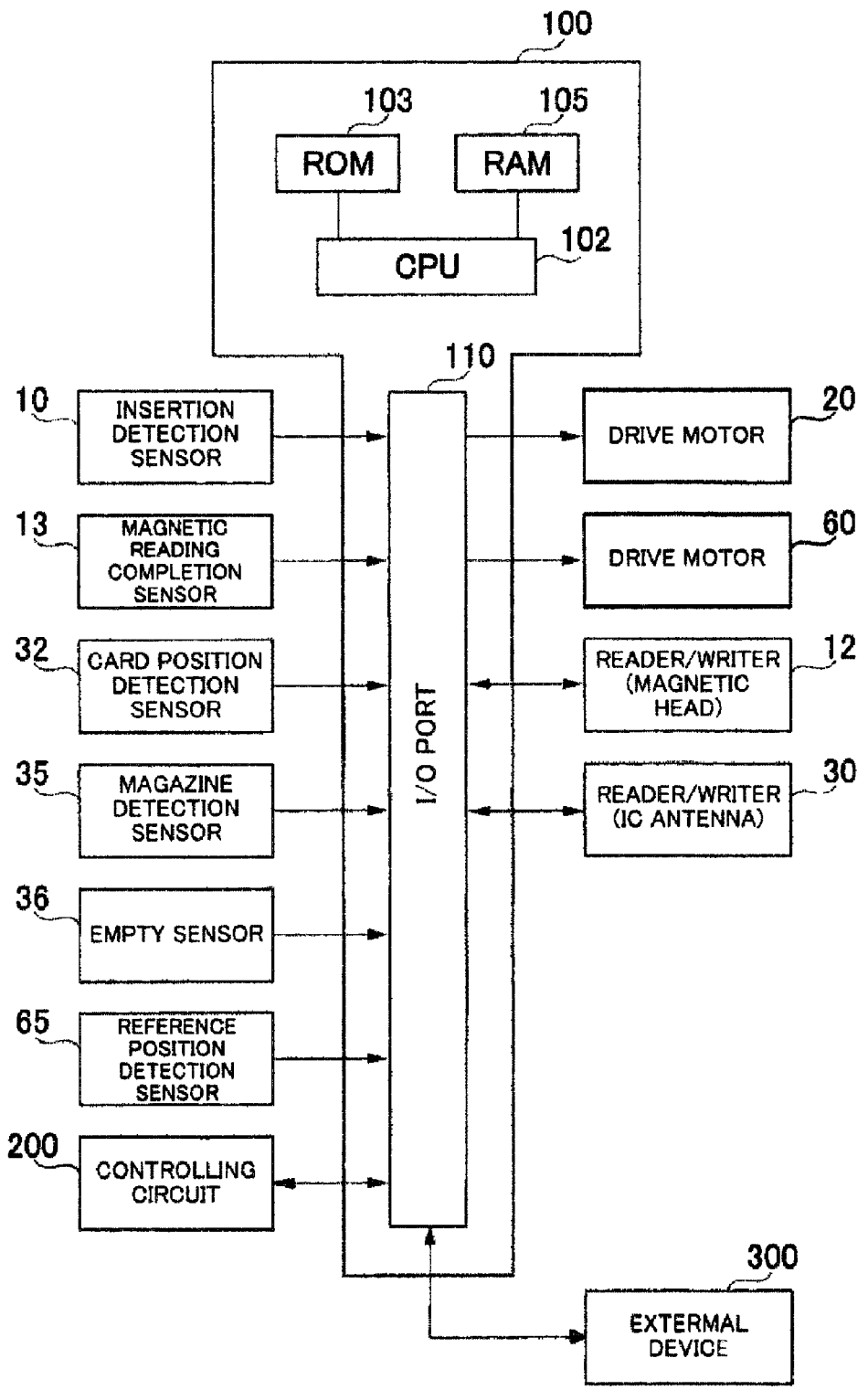
FIG. 11 is a block diagram which shows an example of the construction of a control means for controlling the operation of the card processor.

FIG. 11 is a control block diagram showing a control means for controlling the basic operation of the card processor mentioned above.

A control circuit board 100 which controls the operations the above-mentioned driving members is placed in the card processor 1. This control circuit board 100 has mounted thereon a drive motor 20 for transporting cards mentioned above, a drive motor 60 for driving the shutter 8 and the pressing part 50, a magnetic head (reader/writer) 12 for reading/writing information in a magnetic card, a CPU 102 functioning to control the driving of a reader/writer 30 for reading/writing information in an IC card, a ROM 103 containing operational program for various kinds of drive units mentioned above and the like, and a control RAM 105.

A drive circuit for driving the above-mentioned devices is connected to the CPU 102 via an I/O port 110, and the driving operations of the devices are controlled by control signals from the CPU 102 according to the operational program. In addition, to the CPU 102 is input, via the I/O port 110, a signal for detecting the insertion (discharge) of the card from the insertion detection sensor 10, a signal for detecting that magnetic information is read from the magnetic reading completion sensor 13, a signal for detecting the passage of the card from the card position detection sensor 32, a signal for detecting that the card full state is reached from the magazine detection sensor 35 (or a signal for detecting that the card magazine 5 has been opened), a signal for detecting that there are no more cards in the card magazine 5 from the empty sensor 36, and a signal for detecting the reference position from the reference position detection sensor 65. Based on these detection signals, the driving of the above-mentioned drive motors 20, 60 and reader/writers 12, 30 is controlled.

In addition, the CPU 102 is connected to a controlling circuit 200 executing game processes arranged in a game machine body (not shown), so that it can exchange, for example, data such as game credit information between itself and the game machine side.

Furthermore, the CPU 102 of the above-mentioned control circuit board 100 can exchange data between itself and an external device 300. For example, the CPU 102 transmits information (ID information and transaction information of the user, etc.) obtained through the reader/writers 12, 30.

Next, the control operation of the above-mentioned card processor 1 will be described with reference to the flowcharts in FIGS. 12 to 15.

Firstly, a card processing unit 1 judges whether the magazine detection sensor 35 disposed in the card magazine 5 is detecting the moving member 53 (step S1). As shown in FIGS. 6 and 7C, when the casing 5A of the card magazine 5 is in an open state, the bend portion of the moving member 53 is outside the light receiving and emitting part 35*a*. Therefore, a signal that the moving member 53 cannot be detected is generated and an error signal is transmitted to the CPU (step S1: No, step S2), and the following processes of cards are not performed. In this case, for example, the unit may be configured to transmit an error signal to the external device 300, and notify the administrator of the information that the card magazine 5 is not locked.

Meanwhile, in step S1, if the magazine detection sensor 35 detects the moving member 53 (step S1: Yes), processing of cards is then performed. First, insertion of a card from the insertion slot 2*a* is judged by the insertion detection sensor 10 (step S3). If the insertion detection sensor 10 detects insertion of the card (step S3: Yes), the information of the inserted card is read by the magnetic head (reader/writer) 12 (step S4). In this case, magnetic cards and IC cards (IC/magnetic card) are included in the cards inserted by the user. If no magnetic data is recorded in the inserted card, the card is processed as an IC card (step S5: No).

In addition, even when magnetic data is recorded in the card, the card is processed as an IC card if the magnetic data read contains data which can specify that the card is an IC card (IC card judgment data) (step S5: Yes, step S6: Yes).

In the judging process of the above-mentioned steps S5, and S6, when it is judged that the inserted card is an IC card, the reading process of the magnetic head (reader/writer) 12 is terminated, and the driving process (opening process) of the shutter 8 is performed (step S8). As mentioned above, the shutter 8 and the pressing part 50 are in the reference position shown in FIG. 10A first. Therefore, the drive motor 60 is rotated by a predetermined amount from the state shown in FIG. 10A to rotate the cam gear 61 90° in direction R1. In this case, since the reference position is detected by the reference position detection sensor 65, the stop position (number of revolutions) of the drive motor 60 can be correctly controlled. Accordingly, as shown in FIG. 10B, the shutter 8 opens, and the card lock state is cancelled (step S8).

Subsequently, the drive motor 20 is driven to transport the IC card to a predetermined position, that is, to the position of the reader/writer (IC antenna) 30. Stopping of the driving of the drive motor 20 may be controlled by detecting the amount of rotation of the drive motor 20, or may be controlled based on the card detection signal by the card position detection sensor 32.

In addition, when the IC card is transported to a predetermined position, the shutter 8 is closed (step S10). In this case, the shutter 8 is in an open state by the process of step S8 above (refer to FIG. 10B), and the drive motor 60 is rotated from this state to rotate the cam gear 61 90° in direction R2 and return the same to the reference position shown in FIG. 10A. Stopping of the drive motor 60 can be correctly controlled by detecting the reference position of the cam gear 61 by the reference position detection sensor 65. Accordingly, as shown in FIG. 10A, the shutter 8 closes so that erroneous insertion of cards is prevented (step S10).

As mentioned above, the IC card is transported to the predetermined position, and the reader/writer (IC antenna) 30 is driven in a state that the shutter 8 is closed, and a reading/writing process of information in the IC card is performed (step S11), completing the process. When the above process is completed, for example, the user is playing games on the game machine with the IC card left inserted.

Meanwhile, in the process of the above-mentioned step S6, when it is judged that the inserted card is a magnetic card, the reading process of the magnetic head (reader/writer) 12 is completed when the magnetic reading completion sensor 13 detects the card (step S12) (step S13). In this case, the insertion position of the magnetic card is restricted since the shutter 8 is closed (refer to FIG. 10A), and the user cannot insert the card further inside. In addition, when the user finishes playing games, the card is withdrawn by the user as it is. In this case, the rewriting process of information may be performed by the magnetic head 12.

Figure 13:
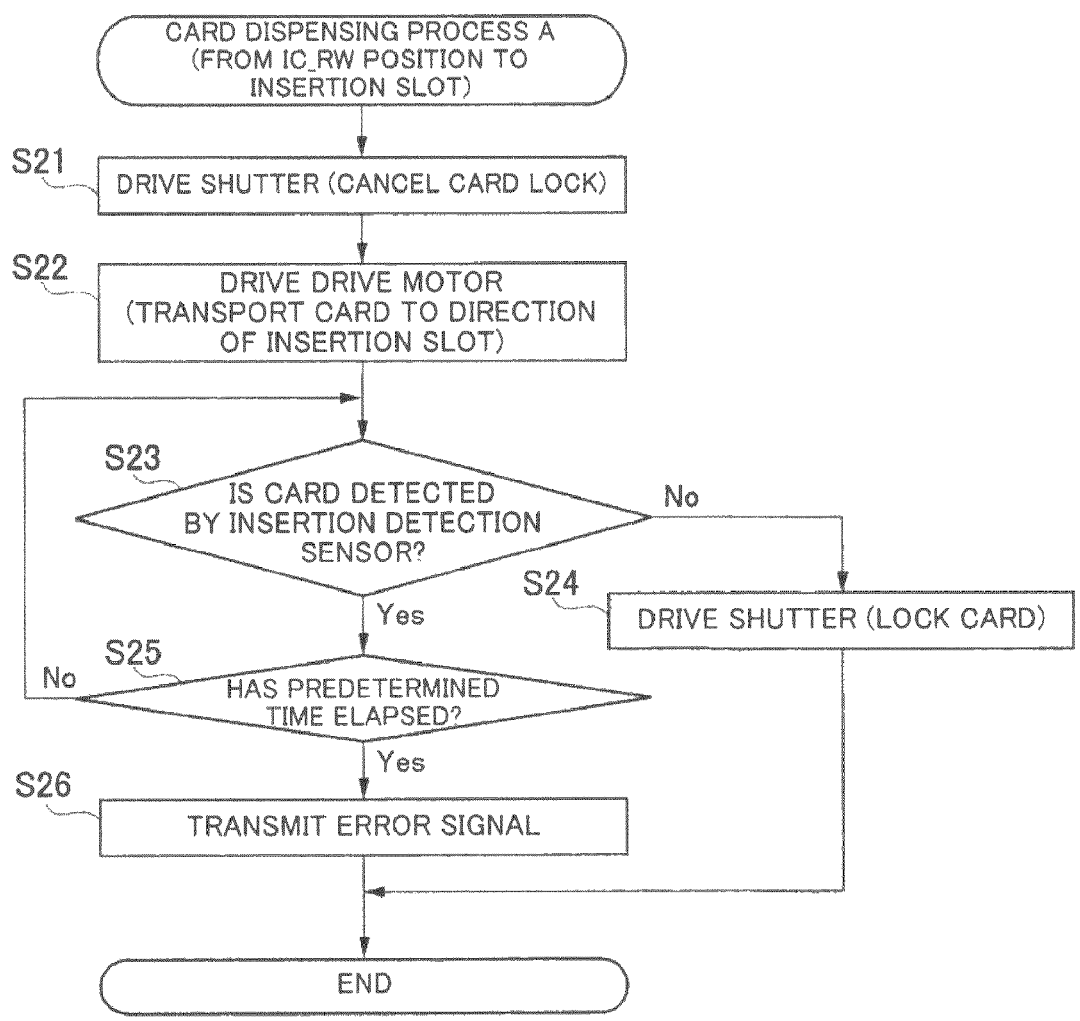
FIG. 13 is a flowchart which shows the controlling operation of the card processor (part 2)

FIG. 13 shows the operation of the process after the completion of step 11 (referred to as card dispensing process A; a continuation process of the step S11) of returning the IC card being inserted to the user. In this case, a rewriting process of new information in the IC card being inserted may be performed by the reader/writer (IC antenna) 30.

When the IC card is returned, the shutter 8 is in the reference position shown in FIG. 10A because of the above-mentioned step S10 and is in a closed state. Therefore, the shutter 8 is driven first to open the shutter 8 (step S21). As in the above-mentioned step S8, the drive motor 60 is rotated by a predetermined amount from the state shown in FIG. 10A to rotate the cam gear 61 90° in direction R1. This opens the shutter 8, and cancels the card lock state.

Subsequently, the drive motor 20 is driven by a predetermined amount, and the IC card is transported to the insertion slot 2a side (step S22). When the player withdraws the IC card protruding from the insertion slot 2a and the insertion detection sensor 10 does not detect the IC card (step S23: No), the shutter 8 is closed again (step S24). This is achieved by, as in the above-mentioned step S10, rotating the drive motor 60 to rotate the cam gear 61 90° in direction R2 and return the cam gear 61 to the reference position shown in FIG. 10A from the state shown in FIG. 10B.

When a predetermined period of time has passed in the state that the insertion detection sensor 10 detects the IC card, the card has been erroneously left or discharging of the card is not performed. Therefore, for example, an error signal is transmitted to the external device 300, and the process is aborted (step 23: Yes, step 25: Yes, step S26).

Figure 14:
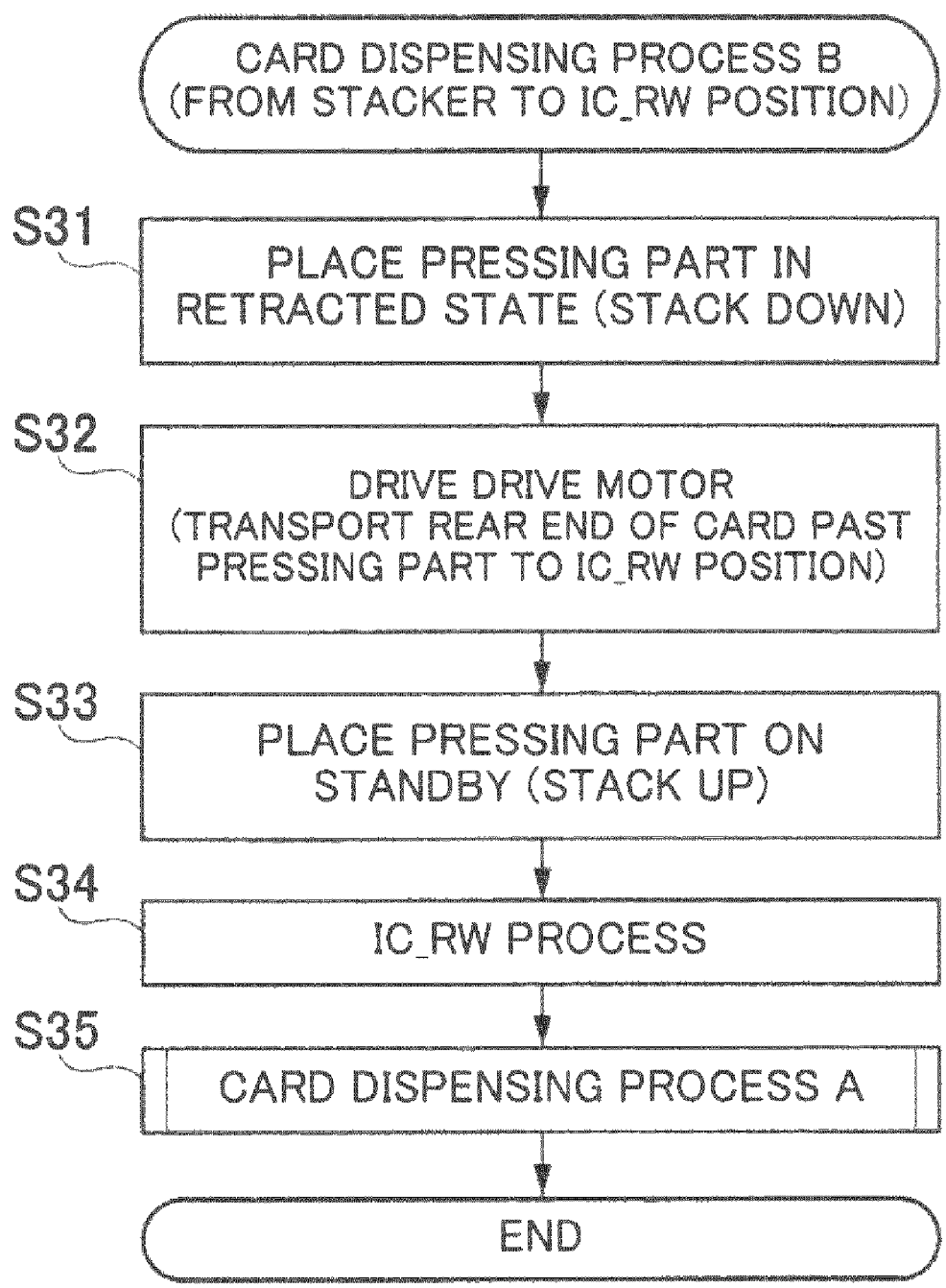
FIG. 14 is a flowchart which shows the controlling operation of the card processor (part 3)

FIG. 14 shows the operation of the process of issuing cards accommodated in the card magazine 5 to the user (referred to as card dispensing process B). In this case, a process of writing information in the IC card dispensed from the card magazine 5 is performed by the reader/writer (IC antenna) 30, and the card is issued to the user.

When an IC card is issued, the pressing part 50 is driven first to cancel the pressing state (step S31). As mentioned above, the shutter 8 and the pressing part 50 are in the reference position shown in FIG. 10A, and the pressing part 50 is in the state of pressing the lowermost card. Therefore, by driving the drive motor 60 by a predetermined amount from the state shown in FIG. 10A to rotate the cam gear 61 90° in direction R2, the pressing part moves downwardly as shown in FIG. 10C, whereby the cards accommodated in the card magazine 5 become unpressed. Accordingly, the lowermost card comes into contact with the driving roller 24.

In this state, the drive motor 20 is driven, and the IC card is transported to a predetermined position on the insertion slot 2a side (step S32). This predetermined position is a position corresponding to that of the reader/writer (IC antenna) 30, and stopping of the driving of the drive motor 20 may be controlled by detecting the amount of rotation of the drive motor 20, or may be controlled based on the card detection signal by the card position detection sensor 32.

When the IC card is transported to the predetermined position, the drive motor 60 is rotated by a predetermined amount to rotate the cam gear 61 90° in direction R1 and return the pressing part 50 to the reference position shown in FIG. 10A. That is, the driving of the drive motor 60 drives the pressing part 50 upwardly, and causes the cards accommodated in the card magazine 5 to be pressed (S33). Stopping of the drive motor 60 can be correctly controlled by detecting the reference position of the cam gear 61 by the reference position detection sensor 65.

In addition, an information writing process is performed by the reader/writer (IC antenna) 30 (step S34), and then the process of issuing an IC card to the user is performed according to the operation procedure of the card dispensing process A shown in FIG. 13 (step S35).

Figure 12:
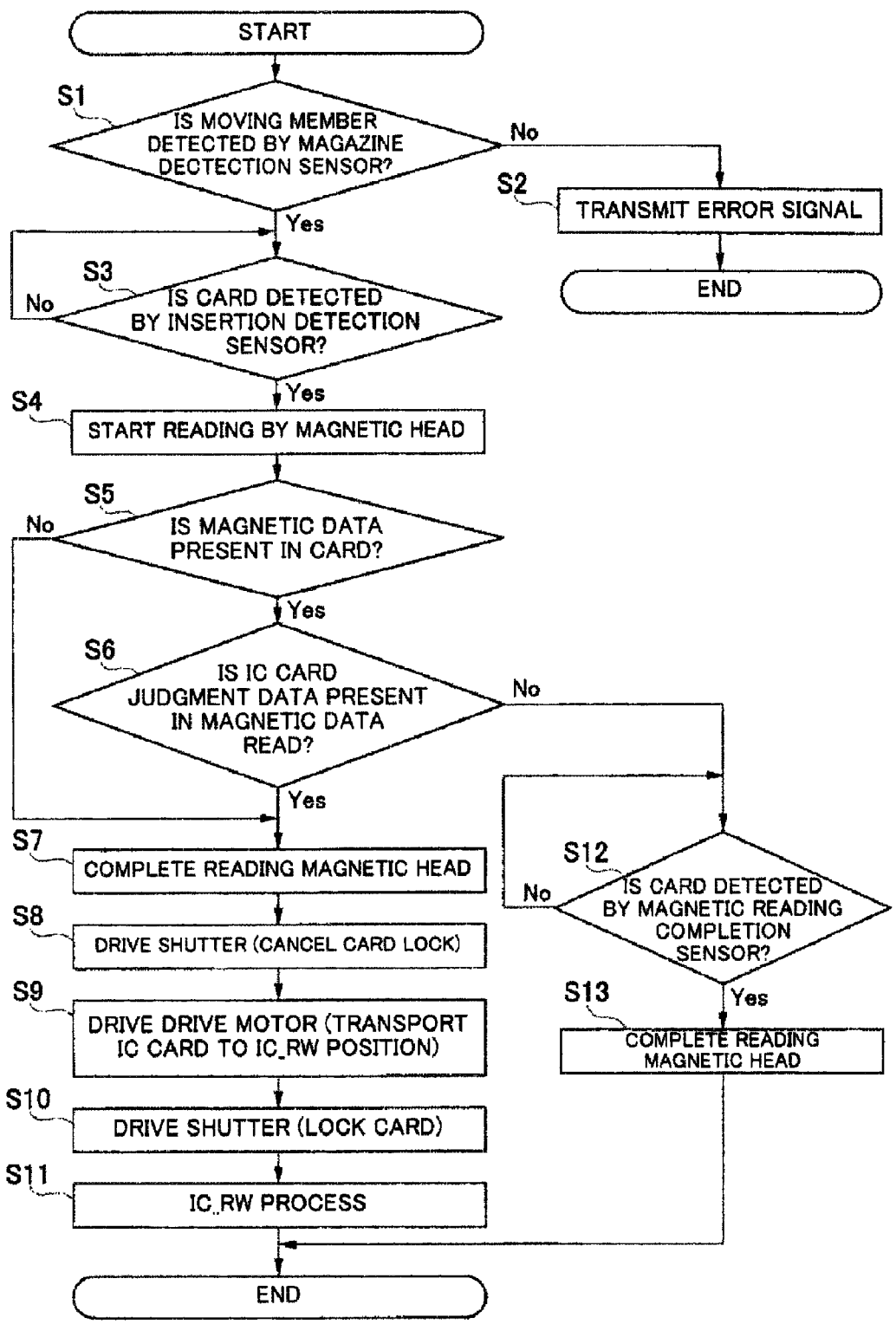
FIG. 12 is a flowchart which shows the controlling operation of the card processor (part 1)
Figure 15:
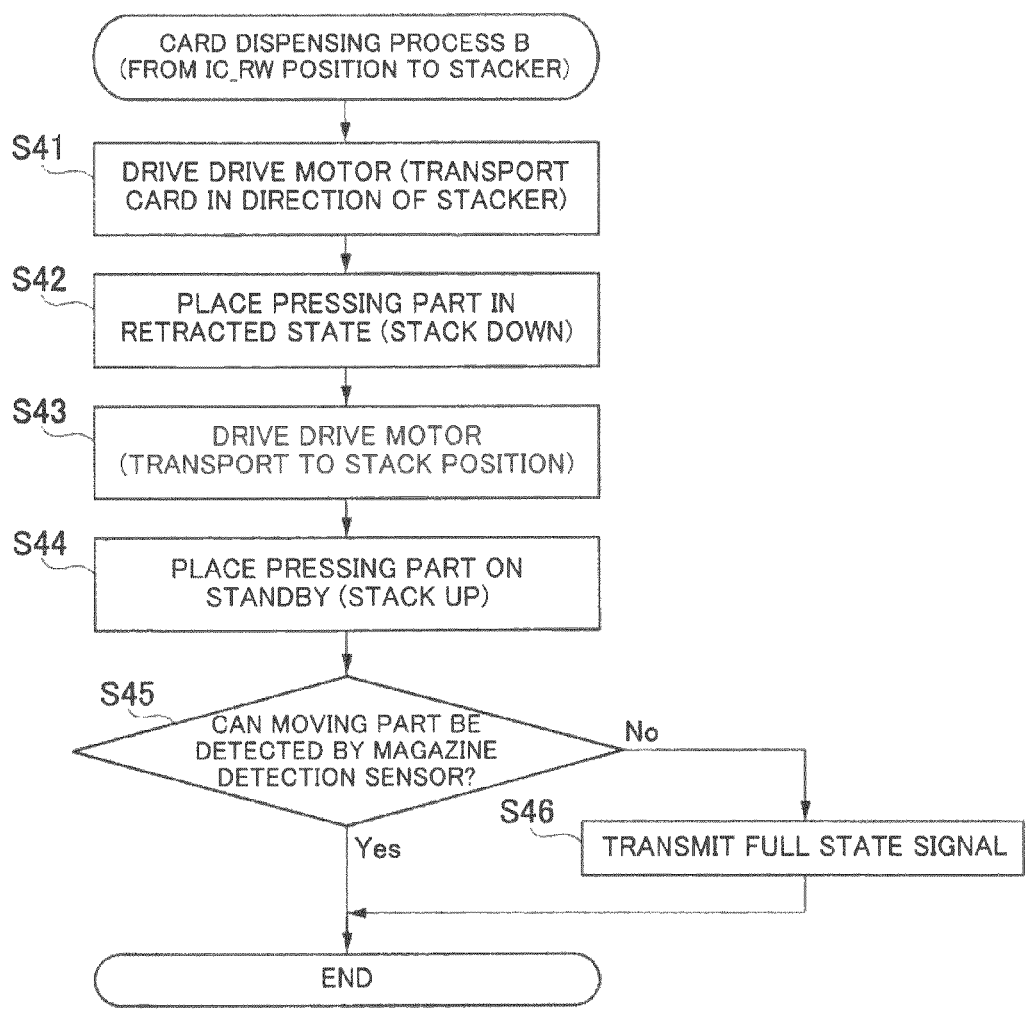
FIG. 15 is a flowchart which shows the controlling operation of the card processor (part 4)

FIG. 15 shows the operation of the process of accommodating the IC card being inserted in the card magazine 5 after the completion of step S11 shown in FIG. 12.

In the accommodating process, the drive motor 20 is driven first, and the IC card is transported to the card magazine 5 side (step S41). At this time, the pressing part 50 is in the reference position shown in FIG. 10A. Therefore, the IC card is inserted through the opening 41 of the casing 5A under the lowermost card. The drive motor 20 is paused based on a predetermined rotation amount, and the IC card is paused in a position short of the elevated pressing part 50. In addition, the drive motor 60 is rotated by a predetermined amount in this state to rotate the cam gear 61 90° in direction R2 and move the pressing part downwardly in FIG. 10C (step S42). Accordingly, the IC card loaded in the card magazine comes into contact with the driving roller 24 and can be loaded further inside.

Thereafter, the drive motor 20 is driven again by a predetermined amount, and the IC card is transported to a predetermined position (stack position) in the card magazine (step S43). In addition, after the IC card is transported to a predetermined position, the drive motor 60 is rotated by a predetermined amount to rotate the cam gear 61 90° in direction R1 and return the pressing part 50 to the reference position shown in FIG. 10A (step S44). Accordingly, the pressing part 50 is driven upwardly to press a newly accommodated IC card, whereby the accommodating operation is completed. After the completion of step S44, if the magazine detection sensor 35 does not detect the moving member 53, as described above, a full state signal is transmitted to the CPU (step S45: No, step S46) since the card magazine 5 has reached the card full state.

According to the construction of the above-mentioned embodiment, as shown in FIG. 10, when one of the shutter 8 and the pressing part 50 is driven, the other is not driven, and therefore a load imposed on the drive motor 60 can be reduced. In addition, individual driving of the shutter 8 and the pressing part 50 can be achieved by merely rotating the cam gear 61 only ±90° about the reference position because of the shape of the cam groove 61A as described above, and controlling of driving is thus facilitated. Furthermore, since the cam groove 61A formed on the cam gear 61 drives the shutter 8 side in a sliding manner with a phase difference of 90° and drives the pressing part 50 side in a swinging manner, the overall size of the device can be reduced.

In addition, the individual driving of the shutter 8 and the pressing part 50 is carried out by forming the cam groove 61A on the cam gear 61 which is rotationally driven by the drive motor 60. Therefore, the control of the individual operation of the shutter 8 and the pressing part 50 can be readily carried out based on the rotational state of the cam gear 61. In particular, the rotation of the drive motor 60 is controlled by forming the detection part which can detect the reference position on the cam gear 61 and detecting the position of the gear by the sensor, the amount of rotation and stop position of the drive motor 60 are specified at all times, and a decrease in the accuracy of the operation of the shutter 8 and the pressing part 50 can be thus prevented. Furthermore, as the position is univocally specified, the need for complicated adjustment during assembly is eliminated.

Embodiments of the present invention have been described above, but the present invention may be constructed to individually drive the shutter 8 disposed at the insertion slot portion and the pressing part 50 for pressing cards in the card magazine by using a single primary drive (when one of them is driven, the other is stopped). That is, the card processor may be provided with the shutter 8 which can close the insertion slot 4 and the pressing part disposed in the card magazine, and the construction of other portions can be modified as appropriately. In addition, in the above-mentioned embodiments, the drive motor is used as the primary drive, but a construction using a solenoid or the like may be employed, and the cam for individual driving may not be formed on the gear. Furthermore, the card magazine 5 is constructed to accommodate cards in a manner of stacking from bottom to top, but it may be constructed to accommodate cards the other way round.

Furthermore, in the above-mentioned embodiments, the card processor is configured to be capable of processing multiple types of cards (magnetic cards, IC cards), but it may be configured to process a single type of cards. For example, the construction shown in FIG. 1 can be also constructed as a device for processing IC cards by eliminating the magnetic head portion. In addition, in the above-mentioned embodiments, devices for processing cards are described exemplarily, but the present invention may be applied to devices for processing various kinds of paper sheets such as bills.

What is claimed is:

1. A paper sheet processing device having:
   an insertion slot through which a paper sheet is inserted;
   a shutter for opening and closing the insertion slot;
   a paper magazine which can sequentially stack and accommodate paper sheets loaded from the insertion slot;
   a pressing part which comes into contact with a paper sheet accommodated in the paper magazine and presses paper sheets stacked; and
   a cam which operates the shutter and the pressing part, and a primary drive which drives the cam,
   wherein the cam has such a shape that when one of the shutter and the pressing part is in operation, the operation of the other is stopped.

2. The paper sheet processing device according to claim 1, wherein the primary drive is constructed by a drive motor, and the cam is formed on a gear which is rotationally driven by the drive motor.

3. The paper sheet processing device according to claim 1 or 2, wherein the cam comprises a detection part which is capable of detecting a reference position by a sensor, and
   rotation of the drive motor is controlled so as to drive either the shutter or the pressing part by detecting the detection part of the cam by the sensor.

* * * * *